US008439560B1

(12) United States Patent
Ladd

(10) Patent No.: US 8,439,560 B1
(45) Date of Patent: May 14, 2013

(54) SYSTEM AND METHOD FOR DETERMINING THE BLACKBODY TEMPERATURE OF AN ELECTRICAL DISCHARGE

(75) Inventor: Michael M. Ladd, Renton, WA (US)

(73) Assignee: The Boeing Company, Chicago, IL (US)

( * ) Notice: Subject to any disclaimer, the term of this patent is extended or adjusted under 35 U.S.C. 154(b) by 568 days.

(21) Appl. No.: 12/705,677

(22) Filed: Feb. 15, 2010

(51) Int. Cl.
*G01K 1/00* (2006.01)

(52) U.S. Cl.
USPC .............................. 374/120; 374/130; 374/208

(58) Field of Classification Search ........................ None
See application file for complete search history.

(56) References Cited

U.S. PATENT DOCUMENTS

| 3,987,298 | A  | 10/1976 | Rotolante |
| 4,647,222 | A  | 3/1987  | Schultheiss |
| 4,750,139 | A  | 6/1988  | Dils |
| 4,823,291 | A  | 4/1989  | Berman |
| 5,364,186 | A  | 11/1994 | Wang et al. |
| 6,488,407 | B1 | 12/2002 | Kitamura et al. |
| 7,001,068 | B2 | 2/2006  | Howard |
| 7,306,367 | B2 | 12/2007 | Salem et al. |
| 2002/0106000 | A1 * | 8/2002 | Morisaki et al. .............. 374/129 |
| 2010/0213867 | A1 * | 8/2010 | Kaening et al. ............... 315/291 |

OTHER PUBLICATIONS

Brewster, M. Quinn, *Thermal Radiative Transfer and Properties*, Chapter 9, "Radiative Properties of Particles," pp. 301-336, published by John Wiley & Sons, Inc. (1992).
McClay, James A. et al., "157 nm optical lithography: The accomplishments and the challenges," *Solid State Technology*, vol. 42, No. 6, p. 57 et seq. (Jun. 1999).
U.S. Appl. No. 12/474,965, filed May 29, 2009, entitled "Spectrally Selective Coatings and Associated Methods for Minimizing the Effects of Lightning Strikes," and the prosecution thereof.

* cited by examiner

*Primary Examiner* — Mirellys Jagan
(74) *Attorney, Agent, or Firm* — Sean Casey

(57) ABSTRACT

A system for determining a blackbody temperature of an electrical discharge including a light-tight enclosure, a viewing aperture sheet received in the light-tight enclosure, the viewing aperture sheet having a first side and a second, opposite side, and defining at least one viewing aperture having a known area, a radiometer having a sensor aperture, the sensor aperture being received in the light-tight enclosure on the first side of the viewing aperture sheet, the sensor aperture being positioned a known distance from the viewing aperture, and an electric current source having an electrode, the electrode being received in the light-tight enclosure on the second side of the viewing aperture sheet.

15 Claims, 3 Drawing Sheets

SYSTEM AND METHOD FOR DETERMINING THE BLACKBODY TEMPERATURE OF AN ELECTRICAL DISCHARGE

FIELD

This application relates to the analysis of electrical discharges and, more particularly, to systems and methods for determining the spectral energy and associated black body temperature of electrical discharges.

BACKGROUND

Certain materials, such as carbon fiber reinforced plastic ("CFRP") materials, may be prone to damage from electrical discharges, such as lightning strikes. Therefore, those skilled in the art continue to seek techniques for reducing or eliminating damage to materials due to electrical discharges.

For example, various spectrally selective coatings and methods for minimizing the effects of electrical discharges, such as lightning, are disclosed in U.S. Ser. No. 12/474,965 filed on May 29, 2009, the entire contents of which are incorporated herein by reference. However, the design of coatings and materials capable of resisting electrical discharges may require, or may be improved by, knowing the spectral energy and associated blackbody temperature of the electrical discharge.

Currently, the blackbody temperature of a lightning strike may be assumed from published values. Unfortunately, the published values of lighting strike temperatures are far ranging in values from approximately 8,000° K to 25,000° K.

Blackbody temperatures may also be estimated based upon post lightning strike thermal analysis and the radiative temperatures required to cause similar damage levels. However, calculating the required blackbody temperature to duplicate lighting strike test damage to CFRP panels is an inaccurate and indirect way of determining the lighting plasma blackbody temperature, and requires accurate knowledge of material layer thermophysical properties during and after extreme erosion.

Photographic techniques are currently used to determine the presence and amount of electrical sparking. However, film and digital photographic techniques do not provide a measure of electrical discharge energy levels and, therefore, cannot be used to determine blackbody temperature.

Other measurement techniques involve the use of spectral radiometers to measure the spectral energy from an electrical discharge. A spectral radiometer may be used to measure the relative spectral energy levels associated with an electrical discharge, but spectral radiometers do not provide the blackbody temperature of the electrical discharge.

A spectral radiometer may also be used to measure absorption lines. The absorption lines occur as a result of atmospheric constituents interacting with the electrical discharge plasma. The characteristic measurement results in a curve showing energy versus wavelength with many narrow lines which rise above the nominal curve height. The width of these lines may be used to analytically provide equivalent blackbody temperature values. This method is highly indirect, requiring many assumptions, in part because the absorption lines are broader at the base than at the peak, and is not based upon accurate measurements of the physical quantities in question because the emission lines coincide with absorption lines. The emissions are also very readily absorbed and, therefore, not present at the sensor aperture in relation to the physical temperature of the arc source.

Accordingly, those skilled in the art continue to seek techniques for determining the blackbody temperature of an electrical discharge.

SUMMARY

In one aspect, the disclosed system for determining a blackbody temperature of an electrical discharge may include a light-tight enclosure, a viewing aperture sheet received in the light-tight enclosure, the viewing aperture sheet having a first side and a second, opposite side, wherein the viewing aperture sheet defines at least one viewing aperture having a known area therein, a radiometer having a sensor aperture, the sensor aperture being received in the light-tight enclosure on the first side of the viewing aperture sheet, the sensor aperture being positioned a known distance from the viewing aperture, and an electric current source having an electrode, the electrode being received in the light-tight enclosure on the second side of the viewing aperture sheet.

In another aspect, the disclosed system for determining a blackbody temperature of an electrical discharge may include a light-tight enclosure, a viewing aperture sheet received in the light-tight enclosure, the viewing aperture sheet having a first side and a second, opposite side, and defining at least one viewing aperture therein, wherein the viewing aperture has a known area, a dielectric aperture/ground plane disposed generally perpendicular to the viewing aperture sheet, the dielectric aperture/ground plane being formed as a layered structure including a first layer that includes a dielectric material and a second layer that includes a conductive material, wherein the first layer defines at least one aperture therein, and wherein the second layer is electrically coupled to ground, an electric current source having an electrode, the electrode being received in the light-tight enclosure on the second side of the viewing aperture sheet, and a radiometer having a sensor aperture, the sensor aperture being received in the light-tight enclosure on the first side of the viewing aperture sheet, the sensor aperture being positioned a known distance from the viewing aperture.

In yet another aspect, the disclosed method for determining a blackbody temperature of an electrical discharge may include the steps of (1) providing a radiometer having a sensor aperture, the sensor aperture having an area, (2) positioning a viewing aperture sheet between the sensor aperture and the electrical discharge, the viewing aperture sheet defining a viewing aperture therein, (3) determining an area of the viewing aperture, (4) determining a distance of the sensor aperture from the viewing aperture, (5) observing the electrical discharge with the sensor aperture through the viewing aperture to obtain experimental radiometer data, and (6) calculating the blackbody temperature based at least on the radiometer experimental data, the viewing aperture area, the sensor aperture area and the distance between the electrical discharge source and the sensor aperture.

The electrical spark may be located closely behind the viewing aperture sheet. Those skilled in the art will appreciate that as the wavefront passes through the viewing aperture, the viewing aperture may act as a secondary radiometric blackbody source. This is known as Huygen's Principal. The wavefront may propagate spherically from this constructed secondary source into the light-tight enclosure. Therefore, this test geometry may be equivalent to the desired, but otherwise impossible experimental condition of measuring the spark of known area, area geometry and distance to the sensor.

Other aspects of the disclosed system and method for determining the blackbody temperature of an electrical discharge will become apparent from the following description, the accompanying drawings and the appended claims.

DETAILED DESCRIPTION

Disclosed is a system and method for the direct measurement and radiative characterization of an electrical discharge. Specifically, the disclosed system and method utilize a dielectric aperture of known geometry for viewing an electrical discharge with a calibrated spectral radiometer. The collected data may then be used to determine the blackbody temperature of the electrical discharge.

Figure 1:
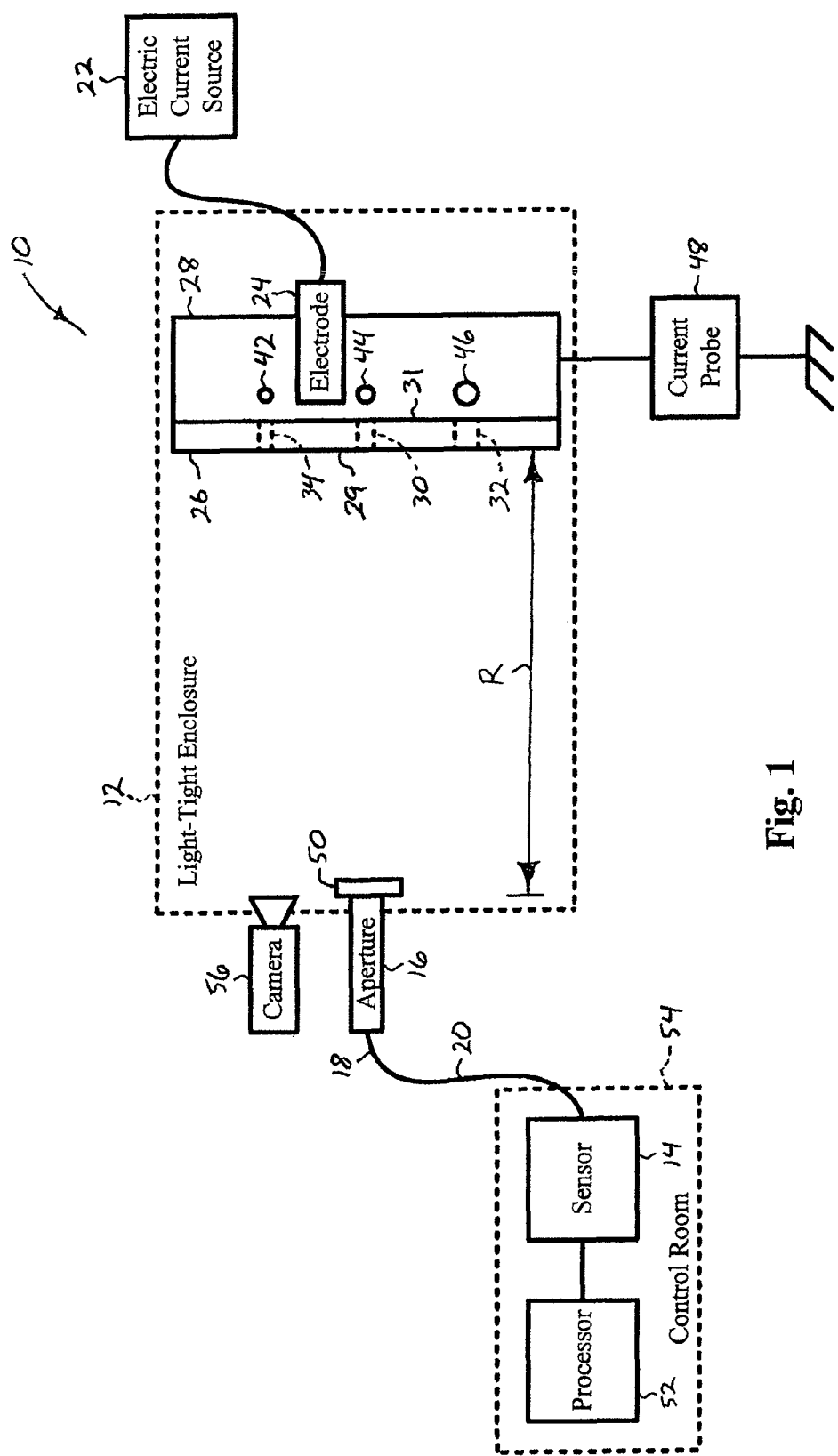
FIG. 1 is a block diagram of one aspect of the disclosed system for determining the blackbody temperature of an electrical discharge.

Referring to FIG. 1, one aspect of the disclosed system for determining the blackbody temperature of an electrical discharge, generally designated 10, may include a light-tight enclosure 12, a radiometer 14 (e.g., a spectral radiometer) having a sensor aperture 16 disposed at the distal end 18 of an optical fiber 20, an electric current source 22 electrically coupled to an electrode 24, a viewing aperture sheet 26 and a dielectric aperture/ground plane 28. The sensor aperture 16, the electrode 24, the viewing aperture sheet 26 and the dielectric aperture/ground plane 28 may be housed within the light-tight enclosure 12 to prevent ambient light from entering the sensor aperture 16 between electrical discharges, and such that the sensor aperture 16 is positioned on a first side 29 of the viewing aperture sheet 26 at a known distance R away from the viewing aperture sheet 26. The electrode 24 may be positioned on a second, opposite side 31 of the viewing aperture sheet 26.

The sensor 14 may be in communication with a processor 52, such as a personal computer. Furthermore, the sensor 14 and the processor 52 may be in a control room 54 that may be shielded from the electromagnetic pulse generated by the electrical discharge. Still furthermore, an optional filter 50 may be positioned in front of the sensor aperture 16 to protect the sensor 14 from overexposure from the electrical discharge. For example, the sensor may have a spectral sensitivity which may provide better accuracy over a primary spectral region. In such a case the filter 50 may be used to filter out all, but a known and desired spectral band. as another example, the filter 50 may be desired to protect the sensor from excessive UV.

Figure 3A:
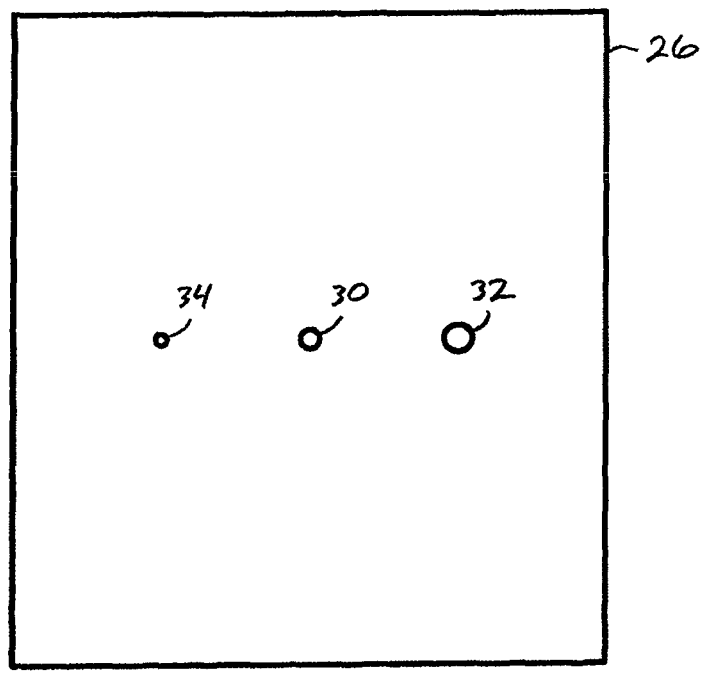
FIG. 3A is a plan view of a viewing aperture sheet of the system shown in FIG. 1.
Figure 3B:
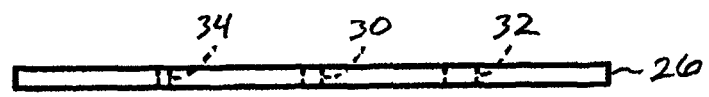
FIG. 3B is a side view of the viewing aperture sheet of FIG. 3A.

The viewing aperture sheet 26 may be a generally planar sheet of dielectric material (e.g., phenolic resin) that defines at least one viewing aperture 30 therein. The use of dielectric material may prevent or inhibit spark attachment to the sheet 26. In one particular implementation, as shown in FIGS. 3A and 3B, the viewing aperture sheet 26 may define multiple viewing apertures 30, 32, 34. Each viewing aperture 30, 32, 34 may have a known area $A_{SourceAperture}$, which may be considered the source area of the electrical discharge when the electrical discharge fills the aperture, as discussed in greater detail below. For example, aperture 34 may be a circular aperture having a diameter of about ⅛ of an inch, aperture 30 may be a circular aperture having a diameter of about ¼ of an inch, and aperture 32 may be a circular aperture having a diameter of about % of an inch.

At this point, those skilled in the art will appreciate that the array of viewing apertures as shown provide choices to the test director to help obtain the desired results of experimental data corresponding to the electrical discharge filling the entire viewing aperture. During any test, the adjacent un-used viewing apertures may be covered over with non-transmissive material such as black tape.

Figure 2A:
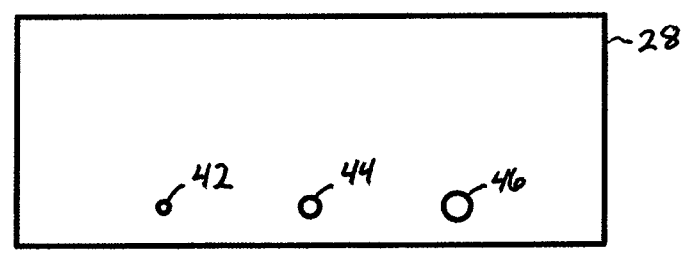
FIG. 2A is a plan view of a dielectric aperture/ground plane of the system shown in FIG. 1.
Figure 2B:
FIG. 2B is a side view of the dielectric aperture/ground plane of FIG. 2A.

As shown in FIGS. 2A and 2B, the dielectric aperture/ground plane 28 may be formed as a layered structure 36 having a first layer 38 of dielectric material positioned over a second layer 40 of electrically conductive material. The dielectric material of the first layer 38 may be fabricated from a high temperature dielectric material, such as phenolic resin. The electrically conductive material of the second layer 40 may be a high temperature metal alloy, such as tungsten alloy, to minimize or avoid melting and vaporization.

The first layer 38 of the dielectric aperture/ground plane 28 may define apertures 42, 44, 46 positioned to align with the viewing apertures 30, 32, 34 of the viewing aperture sheet 26. For example, aperture 42 may be a circular aperture having a diameter of about ¼ of an inch, aperture 44 may be a circular aperture having a diameter of about % of an inch, and aperture 46 may be a circular aperture having a diameter of about ½ of an inch.

Referring back to FIG. 1, the dielectric aperture/ground plane 28 may be positioned generally perpendicular to the viewing aperture sheet 26 and the electrode 24 may be positioned generally perpendicular to and directly adjacent to the desired viewing aperture 30, 32, 34 of the viewing aperture sheet 26. The second layer 40 of the dielectric aperture/ground plane 28 may be electrically coupled to ground and, optionally, a current probe 48 may be positioned between the dielectric aperture/ground plane 28 and ground to obtain accurate measurements of the current associated with the measured electrical discharge.

Without being limited to any particular theory, it is believed that use of the dielectric aperture/ground plane 28 may be optional, but advantageous because the dielectric aperture/ground plane 28 is believed to contain the electrical discharge from the electrode 24 directly in front of the desired viewing aperture 30, 32, 34 of the viewing aperture sheet 26.

At this point, those skilled in the art will appreciate that the viewing apertures 30, 32, 34 of varying sizes may be provided such that a range of waveform current levels may be tested in order to obtain data with the viewing aperture 30, 32, 34 fully filled with the electrical discharge at varying discharge current levels for varying waveforms.

Accordingly, the electrical discharge from the electrode 24 may be viewed by way of the sensor aperture 16 through one of the viewing apertures 30, 32, 34 of the viewing aperture sheet 26. The electrical discharge arc initiation and pulse times may be synchronized with sensor aperture times. The sensor aperture measurement times may be greater than the electrical discharge arc time durations in order to capture the entire pulse radiative energy. Power may be determined by the prescribed and known pulse time and the measured spectral energy.

In one particular aspect, the electrode 24 may be placed adjacent to the viewing aperture 30 such that it would not be viewed by the sensor 14, leaving the aperture 30 open. When the electrical discharge occurs, the spark may be constrained between the electrode 24 and the ground plane aperture 44 adjacent to the viewing aperture 30 and opposite the electrode 24. Therefore the spark may be positioned across the viewing aperture 30. Although the electrode 24 and spark are contained within the overall light-tight enclosure 12, the only radiative path from the spark to the sensor 14 is through the selected viewing aperture 30.

Optionally, an in-scene calibration source may be used prior to the arc tests to confirm and calibrate the sensor response. Furthermore, a photographic or digital camera 56 (FIG. 1) may be used to provide visual corroboration of the electrical discharge arc event and to identify effects such as sparking into the enclosure, which may bias the experimental results of the measurement.

Analytical modeling may be performed to determine the effective blackbody temperatures of the electrical discharges based upon the experimental set-up and measured sensor responses. Analysis should reveal a leveling of calculated blackbody temperature as current levels increase for selected aperture sizes indicating the entire viewing aperture area is filled.

The following equations may be used to determine the arc source spectral energy and associated blackbody temperature:

$$P_{PredictedSpectralPower} = \frac{\sum_\lambda L(\lambda, T) A_{SourceAperture} A_{SensorAperture}}{R^2}$$

$$L(\lambda, T) = SpectralBlackBodyRadiance \left(\frac{watts}{cm_{sr}^2}\right)$$

$$P_{MeasuredSpectralPower} = \frac{Q_{Measured}(joules)}{t_{event}}$$

where:
$P_{Predicted}$=PredictedPower(watts)
$Q_{Measured}$=EnergyMeasuredatSensor
$\lambda$=Wavelength($\mu$m)
T=AbsoluteTemperature(K)
sr=steradian(SolidAngle)
$t_{event}$=DischargeTime(sec)

$$L(\lambda, T) = \frac{\frac{C_1}{\pi}}{\lambda^5 \left(\exp\left[\frac{C_2}{\lambda T}\right] - 1\right)}$$

$$C_1 = 2\pi h c_o^2 = 37{,}413 \frac{watts \mu_m^4}{cm^2}$$

$$C_2 = \frac{h c_o}{k_B} = 14{,}388 \; \mu m K$$

h=Planck'sCons tan t
$k_B$=BoltzmannCons tan t
$A_{SourceAperture}$=SourceArea(cm$^2$)
$A_{SensorAperture}$=SensorArea(cm$^2$)
R=Dis tan ce(cm)

The radiative arc temperature may be determined by comparing the measured spectral power with the predicted equivalent temperature dependent spectral power at selected wavelength regions and sensor spectral integration specifications. The measured spectral power of the electrical discharge event requires knowledge of the measured electrical discharge temporal event and is thus calculated by dividing the measured spectral energy by the electrical discharge duration.

For simplicity, spectral energy is meant to define radiative energy associated with regions of spectral wavelengths. A given sensor 14 may provide only one integrated spectral energy measurement (radiometer) or many energy values at many wavelengths (spectral radiometer). The same methodology applies in all cases.

The calibrated sensor 14 measures radiometric energy within wavelengths which are within the sensitivity region of the sensor and with given accuracy. It follows from above that the predicted power equation may be equated to the measured power quantity. The predicted power may be summed across the same in-band range as the sensor used to derive the measured power quantities. Both the radiometer and spectral radiometer measure "in-band" radiometric energy where "in-band" refers to the energy within two wavelengths. The spectral radiometer just provides more spectral resolution of the radiometric quantities.

Since the sensor aperture 16 is placed at a distance R from the radiative source of a given area and the sensor aperture 16 has a known size $A_{SensorAperture}$ and spectral measurement characteristics, the measured power may be equated to the predicted power as follows:

$$P_{MeasuredSpectralPower} = \frac{\sum_\lambda L(\lambda, T) A_{SourceAperture} A_{SensorAperture}}{R^2}$$

where the temperature value, T may be parametrically varied to obtain energy agreement between measured and predicted values. The resultant temperature value required for energy agreement between the measured and predicted power emitted by the source and measured at the sensor is the quantity of interest.

Thus, use of the viewing aperture provides a known source area to the radiative arc which would otherwise not be quantified. This is only possible if the radiative arc is "filling" the entire viewing aperture area.

Accordingly, the disclosed systems and methods may be used to directly and accurately determine the spectral energy of an electrical discharge, as well as the blackbody temperature of the electrical discharge.

Although various aspects of the disclosed system and method for determining the blackbody temperature of an electrical discharge have been shown and described, modifications may occur to those skilled in the art upon reading the specification. The present application includes such modifications and is limited only by the scope of the claims.

What is claimed is:

1. A system for determining a blackbody temperature of an electrical discharge comprising:
   a light-tight enclosure;
   a viewing aperture sheet received in said light-tight enclosure, said viewing aperture sheet having a first side and a second, opposite side, and defining at least one viewing aperture having a known area;
   a dielectric aperture/ground plane within said light-tight enclosure;
   a radiometer having a sensor aperture, said sensor aperture being received in said light-tight enclosure on said first side of said viewing aperture sheet, said sensor aperture being positioned a known distance from said viewing aperture; and
   an electric current source having an electrode, said electrode being received in said light-tight enclosure on said second side of said viewing aperture sheet.

2. The system of claim 1, wherein said viewing aperture sheet defines a first viewing aperture having a first known area and a second viewing aperture having a second known area, said second known area being greater than said first known area.

3. The system of claim h wherein said radiometer is a spectral radiometer.

4. The system of claim 1, further comprising a filter positioned between said sensor aperture and said viewing aperture sheet.

5. The system of claim 1, wherein said electrode is positioned perpendicular to said viewing aperture sheet and adjacent to said viewing aperture.

6. The system of claim 1, further comprising a camera received in said light-tight enclosure.

7. The system of claim 1, wherein said viewing aperture sheet is formed from a dielectric material.

8. The system of claim 7, wherein said dielectric material includes a phenolic resin.

9. The system of claim 1, wherein said dielectric aperture/ground plane is disposed generally perpendicular to said viewing aperture sheet.

10. The system of claim 9, wherein said dielectric aperture/ground plane is formed as a layered structure comprising a first layer that includes a dielectric material and a second layer that includes a conductive material.

11. The system of claim 10, wherein said second layer is electrically coupled to ground.

12. The system of claim 10, wherein said first layer defines at least one aperture therein.

13. The system of claim 10, wherein said dielectric material comprises phenolic resin.

14. The system of claim 10, wherein said conductive material comprises tungsten.

15. A system for determining a blackbody temperature of an electrical discharge comprising:
a light-tight enclosure;
a viewing aperture sheet received in said light-tight enclosure, said viewing aperture sheet having a first side and a second, opposite side, and defining at least one viewing aperture therein, wherein said viewing aperture has a known area;
a dielectric aperture/ground plane disposed generally perpendicular to said viewing aperture sheet, said dielectric aperture/ground plane being formed as a layered structure comprising a first layer that includes a dielectric material and a second layer that includes a conductive material, wherein said first layer defines at least one aperture therein, and wherein said second layer is electrically coupled to ground;
an electric current source having an electrode, said electrode being received in said light-tight enclosure on said second side of said viewing aperture sheet; and
a radiometer having a sensor aperture, said sensor aperture being received in said light-tight enclosure on said first side of said viewing aperture sheet, said sensor aperture being positioned a known distance from said viewing aperture.

* * * * *

UNITED STATES PATENT AND TRADEMARK OFFICE
CERTIFICATE OF CORRECTION

PATENT NO. : 8,439,560 B1
APPLICATION NO. : 12/705677
DATED : May 14, 2013
INVENTOR(S) : Michael M. Ladd It is certified that error appears in the above-identified patent and that said Letters Patent is hereby corrected as shown below:

In the Claims

Column 7, Claim 3, Line 4 reads "The system of claim h wherein said radiometer is a"

It should read -- The system of claim 1 wherein said radiometer is a --

Signed and Sealed this
Tenth Day of September, 2013

Teresa Stanek Rea
*Acting Director of the United States Patent and Trademark Office*